United States Patent [19]

Sugiura et al.

[11] Patent Number: 5,168,951
[45] Date of Patent: Dec. 8, 1992

[54] THROTTLE VALVE OPERATING DEVICE WITH TRACTION CONTROL FUNCTION

[75] Inventors: Toshio Sugiura; Sunao Kitamura; Mutumi Tsujino; Masanori Yasuda, all of Ubu, Japan

[73] Assignee: Aisan Kogyo Kabushiki Kaisha, Obu, Japan

[21] Appl. No.: 669,021

[22] Filed: Mar. 13, 1991

[30] Foreign Application Priority Data

Mar. 16, 1990 [JP] Japan .................................... 2-67544
Jul. 12, 1990 [JP] Japan ............................. 2-73984[U]

[51] Int. Cl.5 ............................................ B60K 28/16
[52] U.S. Cl. .................................... 180/197; 123/361; 123/399
[58] Field of Search ................. 180/197; 123/361, 399

[56] References Cited

U.S. PATENT DOCUMENTS

| 4,850,319 | 7/1989 | Imoehl ................. | 123/361 |
| 4,951,772 | 8/1990 | Peter et al. ........... | 180/197 |
| 5,016,589 | 5/1991 | Terazawa ............. | 123/399 |
| 5,018,496 | 5/1991 | Buchl .................. | 123/399 |
| 5,022,369 | 6/1991 | Terazawa ............. | 123/399 |
| 5,035,218 | 7/1991 | Takeuchi et al. ..... | 123/361 |

FOREIGN PATENT DOCUMENTS

61-75024  4/1986  Japan .

Primary Examiner—Margaret A. Focarino
Assistant Examiner—Kevin Hurley
Attorney, Agent, or Firm—Dennison, Meserole, Pollack & Scheiner

[57] ABSTRACT

A throttle valve operating device with traction control function including a throttle shaft adapted to be rotated with a throttle valve; a throttle lever adapted to be rotated relative to the throttle shaft by operating an accelerator pedal; a mechanism for interconnecting the throttle shaft and the throttle lever so as to transmit a depression force applied to the accelerator pedal to the throttle shaft; and a traction control actuator for rotating the throttle shaft irrespective of the depression force of the accelerator pedal upon detection of a slip condition of driving wheels. The interconnecting mechanism includes at least two springs independently provided between the throttle lever and the throttle shaft. Furthermore, a pair of spring guides for guiding opposite end portions of each spring are included in the interconnecting mechansim. Each of the spring guides is provided with a flange poriton for separating one end portions of the springs from each other.

4 Claims, 7 Drawing Sheets

THROTTLE VALVE OPERATING DEVICE WITH TRACTION CONTROL FUNCTION

BACKGROUND OF THE INVENTION

The present invention relates to a throttle valve operating device for use with an engine for a vehicle, and more particularly to a throttle valve operating device with traction control function such that when a slip condition of driving wheels of the vehicle is detected, a throttle valve is forcibly closed irrespective of accelerator pedal operation to reduce an output of the engine.

Conventionally, such a throttle valve operating device with traction control function is disclosed in Japanese Patent Laid-open Publication No. 61-75024, for example. A construction of the conventional throttle valve operating device is schematically shown in FIGS. 11A to 11C.

Figure 11A:
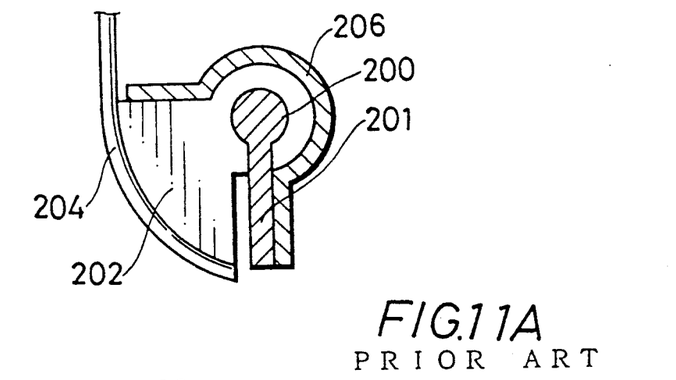
FIGS. 11A to 11C are schematic illustrations of the interconnecting relation among the throttle shaft, the throttle lever and the torsion spring in the prior art.
Figure 11B:
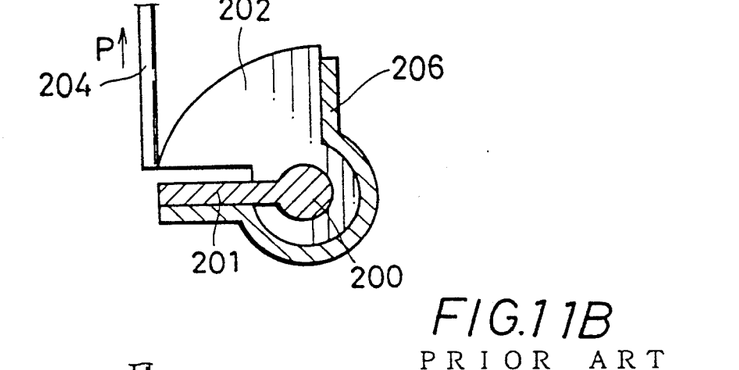
Figure 11C:
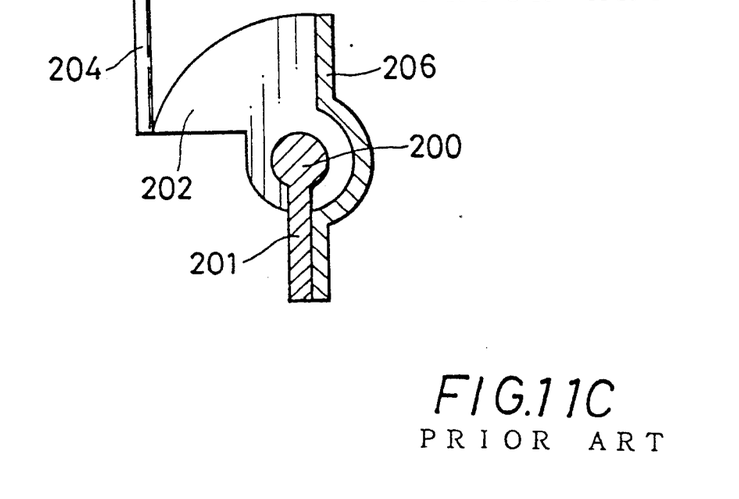

Referring to FIGS. 11A to 11C, reference numeral 200 designates a throttle shaft adapted to be rotated with a throttle valve (not shown). An arm 201 extends radially outwardly from the throttle shaft 200. A throttle lever 202 is connected to an end of an accelerator cable 204. The other end of the accelerator cable 204 is connected to an accelerator pedal (not shown). When the accelerator pedal is depressed, the throttle lever 202 is rotated clockwise through the accelerator cable 204. The throttle lever 202 is mounted on the throttle shaft 200 so as to be rotatable relative to the throttle shaft 200. Both the arm 201 of the throttle shaft 200 and the throttle lever 202 are biased by a torsion spring 206 so as to maintain a given positional relationship. That is, an end portion of the torsion spring 206 normally biases the throttle lever 202 in a counterclockwise direction, and the other end portion of the torsion spring 206 normally biases the arm 201 of the throttle shaft 200 in a clockwise direction.

FIG. 11A shows a condition where the accelerator pedal is not depressed. Under the condition, the throttle valve is in a full closed condition.

FIG. 11B shows a condition where the accelerator pedal is depressed from the condition of FIG. 11A. When the accelerator pedal is depressed, the accelerator cable 204 is drawn in a direction of arrow P, and the throttle lever 202 is accordingly rotated clockwise from the condition of FIG. 11A. At the same time, the arm 202 and the throttle shaft 200 are rotated clockwise by the torsion spring 206 from the condition of FIG. 11A. As a result, the throttle valve is opened.

FIG. 11C shows a condition where a traction control motor (not shown) is driven upon detection of the slip condition to forcibly rotate the throttle shaft 200 in the closing direction of the throttle valve. Under the condition, the accelerator cable 204 is maintained in the drawn condition by the depression of the acclerator pedal, and the throttle lever 202 is maintained in abutment against the one end portion of the torsion spring 206. On the other hand, the other end portion of the torsion spring 206 is urged by the arm 201 due to the forced rotation of the throttle shaft 200 in the counterclockwise direction from the condition of FIG. 11B by the operation of the traction control motor. As a result, the torsion spring 206 is elastically deformed as shown in FIG. 11C.

According to the above construction utilizing the torsion spring 206, when the traction control motor is in an inoperative condition, the throttle shaft 200 is rotated by the operation of the accelerator pedal through the torsion spring 206, while when the traction control motor is operated, the throttle shaft 200 is rotated in the closing direction of the throttle valve by the operation of the motor owing to the elastic deformation of the torsion spring 206 irrespective of the depression of the accelerator pedal.

However, the above interconnection between the throttle lever 202 and the throttle shaft 200 is provided by the single torsion spring 206. Accordingly, if the torsion spring 206 is broken for any reason, the throttle shaft 200 cannot be rotated by the throttle lever 202. That is, the throttle valve cannot be operated by the operation of the accelerator pedal. In the circumstances that recent improvement of engine performance has permitted high-speed rotation of the engine, the throttle valve and its peripheral region tend to be vibrated at a high frequency, causing a risk of breakage of the torsion spring 206.

SUMMARY OF THE INVENTION

It is an object of the present invention to provide a throttle valve operating device with traction control function which can reliably operate the throttle valve even when the above trouble is generated.

According to the present invention, there is provided a throttle valve operating device with a traction control function comprising a throttle shaft adapted to be rotated with a throttle valve; a throttle lever adapted to be rotated relative to said throttle shaft by operating an accelerator pedal; means for interconnecting said throttle shaft and said throttle lever so as to transmit a depression force applied to said accelerator pedal to said throttle shaft; and a traction control actuator for counter rotating said throttle shaft irrespective of the depression force of said accelerator pedal upon detection of a slip condition of the driving wheels; wherein said interconnecting means comprises at least two springs independently provided between said throttle lever and said throttle shaft.

With this construction, even when one of the springs is broken, the throttle lever and the throttle shaft are yet interconnected with each other by the other spring. Accordingly, the throttle valve can be reliably operated by operating the accelerator pedal.

However, there is a possibility that the springs will interfere with each other to reduce a durability of the springs.

It is accordingly another object of the present invention to provide a construction which can eliminate the interference of the springs.

According to the present invention, the above-mentioned control device further comprises a pair of spring guides for guiding opposite end portions of said each spring, each of said spring guides being provided with a flange portion for separating one end portions of said springs from each other.

The invention will be more fully understood from the following detailed description and appended claims when taken with the drawings.

DETAILED DESCRIPTION OF THE PREFERRED EMBODIMENTS

There will now be described a preferred embodiment of the present invention with reference to the drawings.

Figure 1:
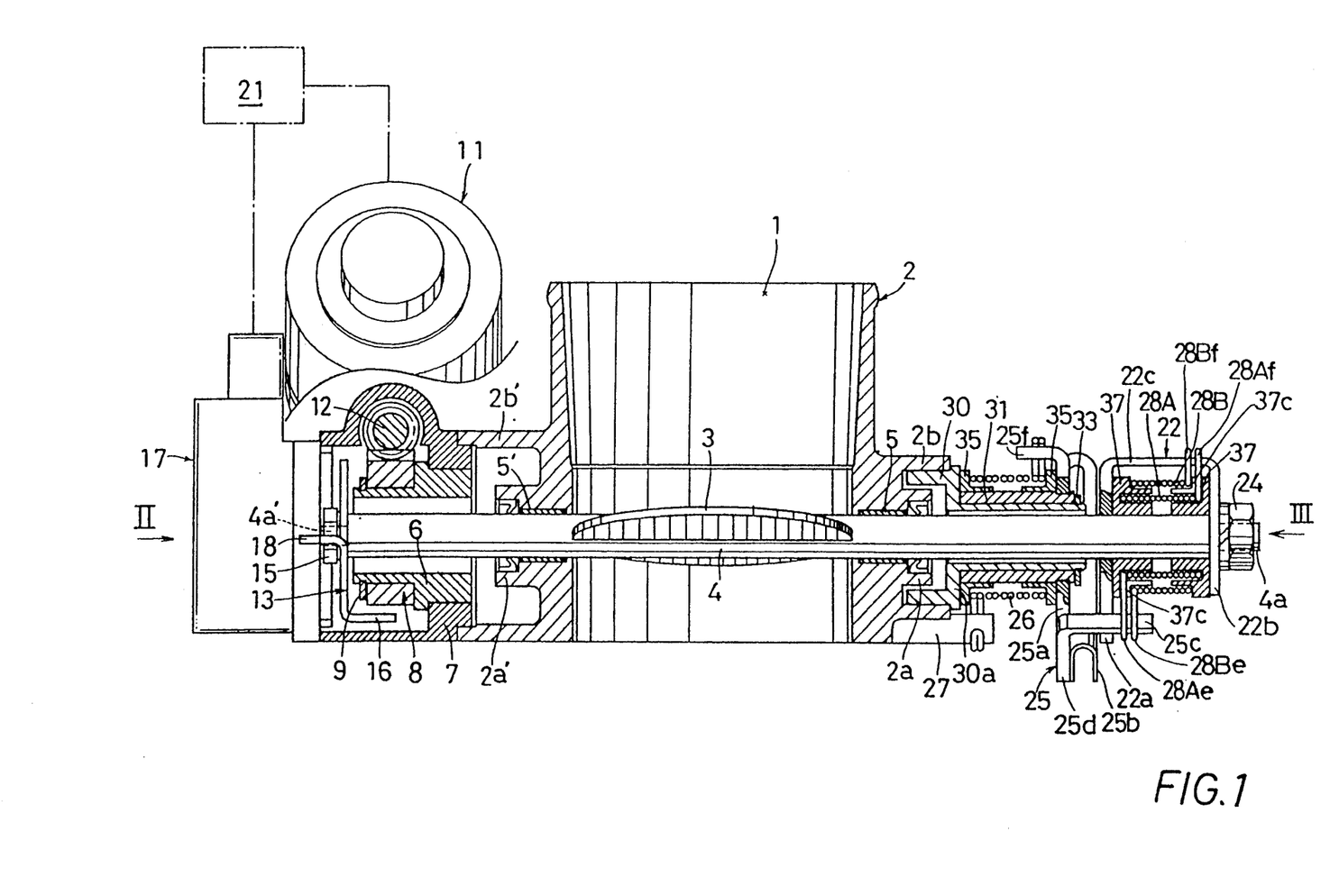
FIG. 1 is a vertical sectional view of the throttle valve operating device according to a preferred embodiment of the present invention.

Referring to FIG. 1 which shows a general construction of the throttle valve operating device with traction control function according to the present invention, reference numeral 2 designates a throttle body forming therein an air supply passage 1 for supplying a suction air to an engine (not shown).

There is provided in the air supply passage 1 a throttle valve 3 for controlling a suction air quantity to be supplied to the engine by changing a passage area of the air supply passage 1. The throttle valve 3 is fixed to a throttle shaft 4 rotatably supported through right and left bearings 5 and 5′ to right and left boss portions 2a and 2a′ of the throttle body 2. The throttle shaft 4 projects outwardly from the right and left boss portions 2a and 2a′. The throttle shaft 4 is formed at its opposite ends with right and left small-diameter shaft portions 4a and 4a′. Each of the small-diameter shaft portions 4a and 4a′ is formed with an external thread, and has a substantially oval shape forming a width across flats.

The throttle body 2 is formed with right and left cylindrical portions 2b and 2b′ surrounding the right and left boss portions 2a and 2a′ in concentrical relationship therewith, respectively.

A housing 7 is mounted by press fitting to the left cylindrical portion 2b′ of the throttle body 2. A substantially cylindrical bush 6 is housed in the housing 7, and is mounted by press fitting to the housing 7. The left projecting portion of the throttle shaft 4 is inserted in the bush 6. A worm wheel 8 is rotatably mounted on the bush 6, and a stop ring 9 for preventing escape of the worm wheel 8 is fixedly mounted on the bush 6.

Figure 2:
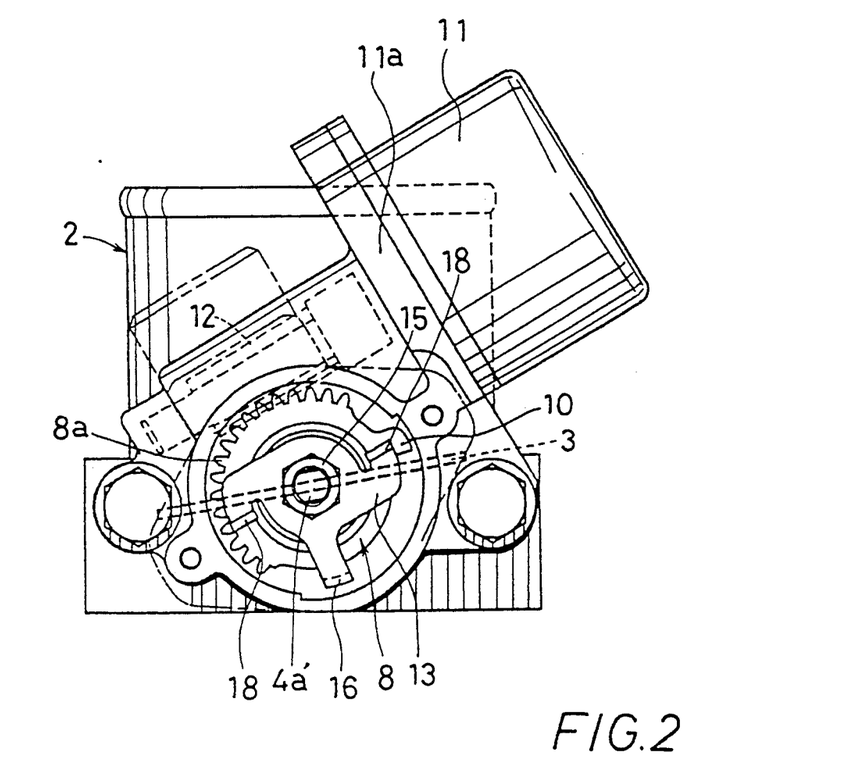
FIG. 2 is a side view taken in the direction of arrow II in FIG. 1 with a throttle sensor removed.

Referring to FIG. 2 which is a left side view of FIG. 1, the worm wheel 8 is formed at about a half of its outer circumference with a toothed portion 8a. The worm wheel 8 is further formed at its remaining half of the outer circumference with a pawl 10 projecting outwardly.

A traction control motor 11 is supported through a bracket 11a to the left side surface of the throttle body 2. A worm gear 12 is fixedly mounted on an output shaft of the control motor 11. The worm gear 12 is housed in the housing 7, and is meshed with the toothed portion 8a of the worm wheel 8. The control motor 11, the worm wheel 8 and the worm gear 12 constitute the traction control actuator according to the present invention.

A substantially disk-like stopper lever 13 is fixed to the small-diameter left shaft portion 4a′ of the throttle shaft 4 by a nut 15. More specifically, the stopper lever 13 is formed with a mounting hole (not shown) to be engaged with the left shaft portion 4a′. Under the engaged condition of the mounting hole of the stopper lever 13 with the left shaft portion 4a′, the nut 15 is threadly engaged with the left shaft portion 4a′, thus fixing the stopper lever 13 to the throttle shaft 4.

Figure 5:
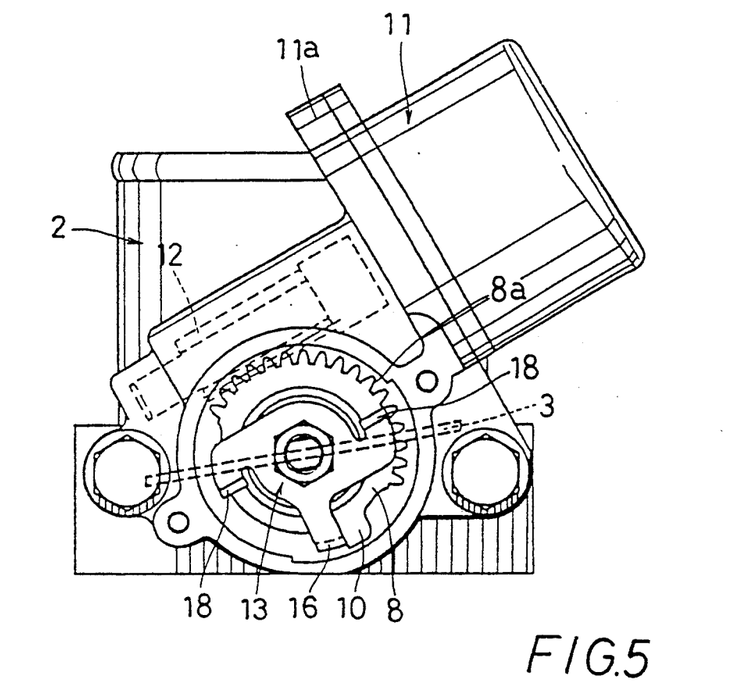
FIG. 5 is a view similar to FIG. 2, showing a closed condition of the throttle valve obtained by operating the traction control actuator under the depressed condition of the accelerator pedal.
Figure 6:
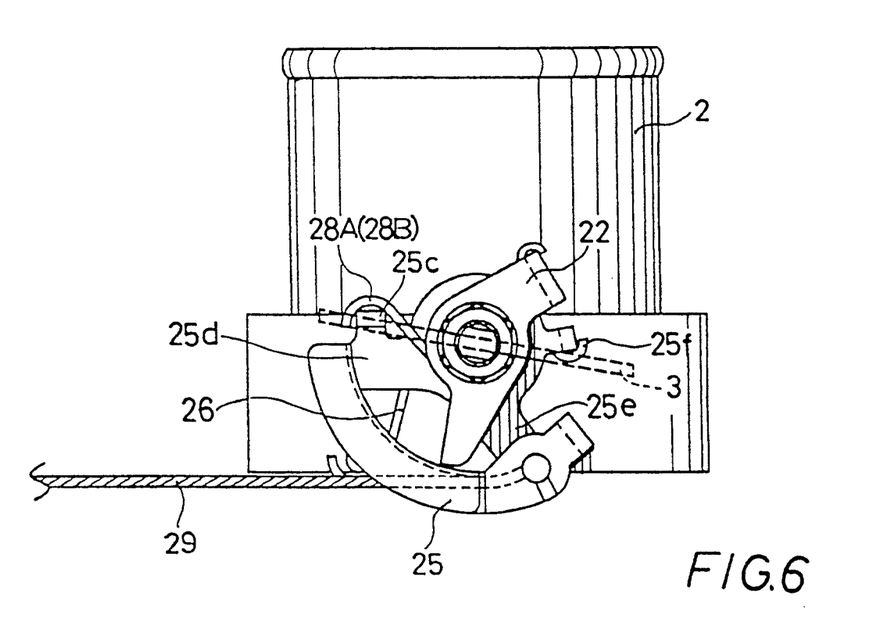
FIG. 6 is a view similar to FIG. 3, showing the condition of FIG. 5.

The stopper lever 13 is formed at its outer circumference with a pawl 16 projecting outwardly and bent toward the worm wheel 8, and with a pair of pawls 18 projecting outwardly and bent away from the worm wheel 8. When the worm wheel 8 is rotated clockwise from the condition shown in FIG. 2, the pawl 10 of the worm wheel 8 comes into abutment against the pawl 16 of the stopper lever 13 (see FIG. 5). The pawls 18 of the stopper lever 13 are engaged with detection members (not shown) of a throttle sensor 17 mounted on a left end surface of the housing 7. As well known, the throttle sensor 17 functions to detect an opening angle of the throttle valve 3.

A control circuit 21 is provided to receive a detection signal from the throttle sensor 17 and detection signals from a driving wheel speed sensor and a driven wheel speed sensor (both not shown). As well known, the control circuit 21 functions to determine a slip condition of driving wheels of a vehicle according to the detection signals from the throttle sensor 17, the driving wheel speed sensor and the driven wheel speed sensor, and drive the control motor 11.

On the right side of the throttle body 2, a substantially cylindrical bush 30 is mounted by press fitting to the right cylindrical portion 2b of the throttle body 2. A bearing 31 is rotatably mounted on the bush 30, and a stop ring 33 for preventing escape of the bearing 31 is fixedly mounted on the bush 30. A throttle lever 25 is fixedly mounted on the bearing 31 at a right end portion thereof. Accordingly, the throttle lever 25 is rotatable with the bearing 31 relative to the bush 30 which is fixed to the throttle body 2. Further, the right projecting portion of the throttle shaft 4 is inserted in the bush 30. Accordingly, the throttle lever 25 and the throttle shaft 4 are relatively rotatable.

Figure 3:
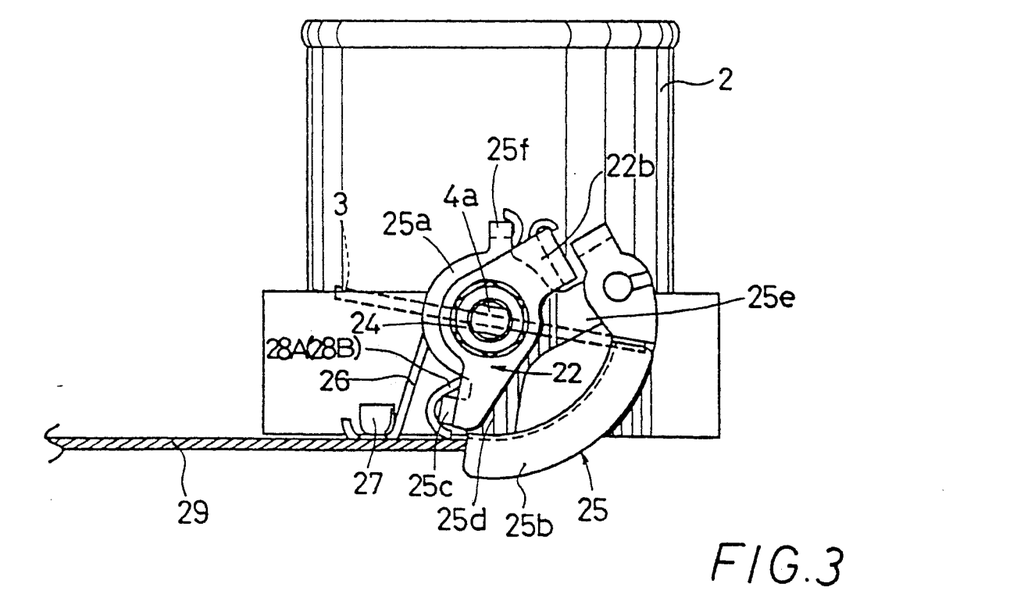
FIG. 3 is a side view taken in the direction of arrow III in FIG. 1.

As shown in FIGS. 1 and 3, the throttle lever 25 includes a disk portion 25a to be fixed to the bearing 31, two arm portions 25d and 25e projecting radially outwardly, and a cable guide portion 25b connected through the arm portions 25d and 25e to the disk portion 25a. The cable guide portion 25b has an arcuate shape (see FIG. 3), and has a U-shaped cross section (see FIG. 1). One end portion of an accelerator cable 29 is connected to the cable guide portion 25b, and is guided by an arcuate groove formed by the cable guide portion 25b, while the other end portion of the accelerator cable 29 is connected to a accelerator pedal (not shown). The disk portion 25a is formed with a pawl 25f projecting radially outwardly and bent toward the throttle body 2. The arm portion 25d is formed with a pawl 25c projecting from one side edge thereof and bent away from the throttle body 2.

As shown in FIG. 1, a pair of right and left spring guides 35 are mounted on the bearing 31 between the disk portion 25a of the throttle lever 25 and a shoulder portion 30a of the bush 30. A back spring 26 as a torsion coil spring is interposed between both the spring guides 35.

One end portion of the back spring 26 is engaged with a pin 27 projecting from the right side surface of the throttle body 2, and the other end portion of the back spring 26 is engaged with the pawl 25f of the disk portion 25a of the throttle lever 25. The back spring 26 normally biases the throttle valve 3 in a closing direction thereof (i.e., in the counterclockwise direction as viewed in FIG. 3). In other words, the back spring 26 normally biases the throttle lever 25 in a direction counter to a drawing direction of the accelerator cable 29 to be drawn by the accelerator pedal.

A throttle arm 22 having an invertedly U-shaped configuration as viewed in FIG. 1 is fixed by a nut 24 to the small-diameter right shaft portion 4a of the throttle shaft 4. More specifically, the throttle arm 22 is comprised of a first leg portion 22a having a through-hole (not numbered) for inserting the throttle shaft 4 therethrough, a second leg portion 22b having a mounting hole (not shown) to be engaged with the right shaft portion 4a, and a bridge portion 22c with the right shaft portion 4a, and a bridge portion 22c bridging the first leg portion 22a and the second leg portion 22b. Under the condition where the through-hole of the first leg portion 22a of the throttle arm 22 is engaged with the throttle shaft 4, and the mounting hole of the second leg portion 22b is engaged with the right shaft portion 4a, the nut 24 is threadedly engaged with the right shaft portion 4a, thus fixing the throttle arm 22 to the throttle shaft 4.

As shown in FIG. 1, a pair of right and left spring guides 37 are loosely mounted on the throttle shaft 4 between both the leg portions 22a and 22b of the throttle arm 22. A first relief spring 28A as a torsion coil spring and a second relief spring 28B as a torsion coil spring having a coil diameter larger than that of the first relief spring 28A are interposed between both the spring guides 37 in concentrical relationship with each other.

One end portions 28Af and 28Bf of the relief springs 28A and 28B are in resilient abutment against the bridge portion 22c of the throttle arm 22, and the other end portions 28Ae and 28Be of the relief springs 28A and 28B are in resilient abutment against the pawl 25c of the throttle lever 25. That is, both the relief springs 28A and 28B normally bias the throttle arm 22 in an opening direction of the throttle valve 3, i.e., in the clockwise direction as viewed in FIG. 3, and simultaneously normally biases the throttle lever 25 in a closing direction of the throttle valve 3, i.e., in the counterclockwise direction as viewed in FIG. 3. The first leg portion 22a of the throttle arm 22 is in abutment against the pawl 25c of the throttle lever 25 by the biasing force of the relief springs 28A and 28B applied to the throttle arm 22. As a result, a relative angular position between the throttle shaft 4 and the throttle lever 25 is maintained. The total spring force of the relief springs 28A and 28B is set to be smaller than the spring force of the back spring 26.

Figure 7A:
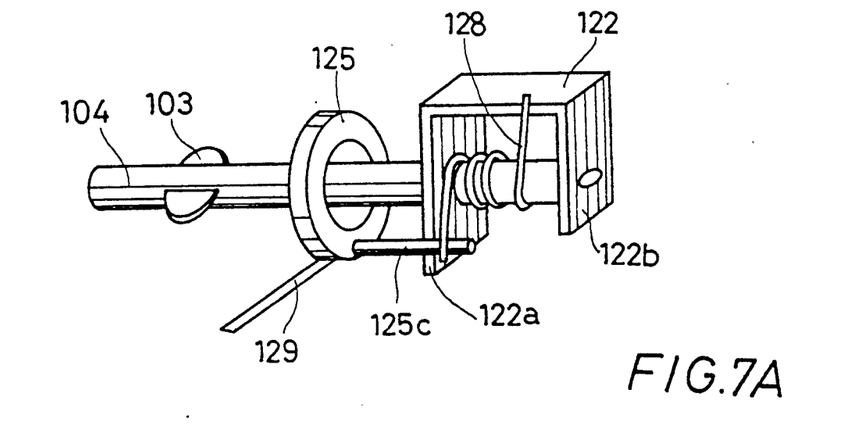
FIGS. 7A to 7C are schematic perspective views illustrating the interconnecting means according to the present invention.
Figure 7B:
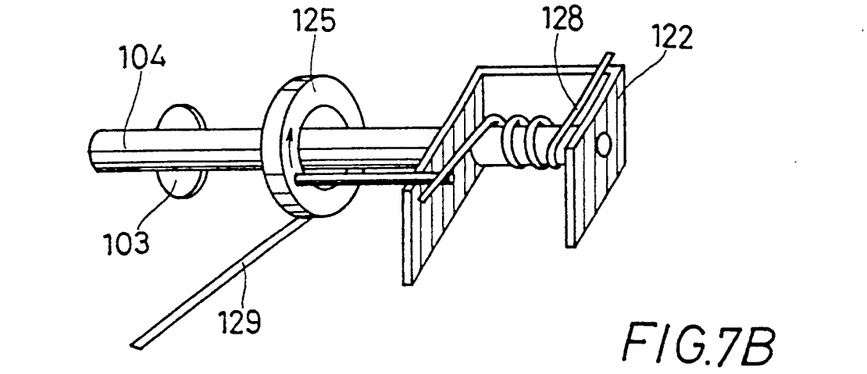
Figure 7C:
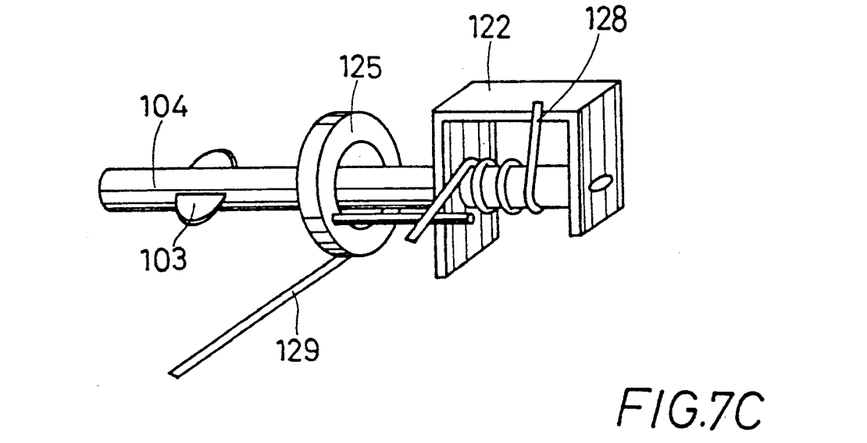

The above-mentioned interconnecting relation among the throttle lever 25, the throttle arm 22 and the relief springs 28A and 28B will be more readily understood with reference to FIGS. 7A to 7C showing various conditions corresponding to FIGS. 11A to 11C, respectively. In FIGS. 7A to 7C, the constituent members are designated by 100 plus the same reference numbers as mentioned above, and the two relief springs are shown by a single relief spring 28 for the sake of simplicity of illustration.

The operation of the above preferred embodiment will now be described.

(1) Throttle Valve Operation without Traction Control

When the accelerator pedal is in an undepressed condition, the throttle shaft 4 is biased by the back spring 26 in the counterclockwise direction as viewed in FIG. 3 through the throttle lever 25 and the throttle arm 22. Accordingly, the throttle valve 3 is maintained in the closed condition as shown in FIGS. 1 to 3 (see FIG. 7A).

Figure 4:
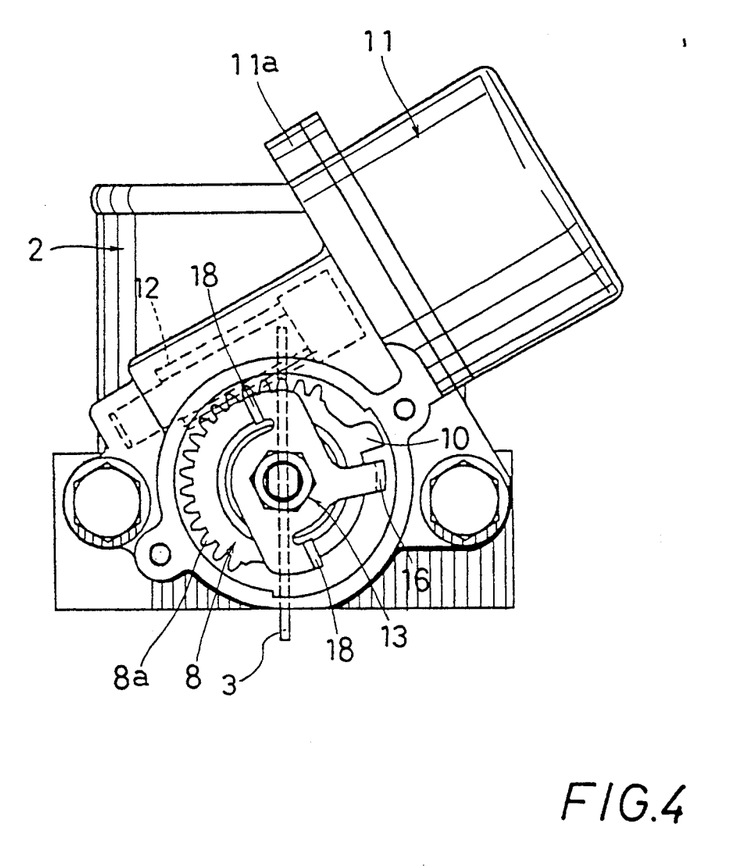
FIG. 4 is a view similar to FIG. 2, showing a full open condition of the throttle valve obtained by fully depressing the accelerator pedal.

When the accelerator pedal is depressed from the above condition, the throttle lever 25 is rotated in the clockwise direction as viewed in FIG. 3 through the accelerator cable 29 against the biasing force of the back spring 26. Accordingly, the throttle arm 22 and the throttle shaft 4 are rotated in the same direction by the biasing force of the relief springs 28A and 28B. As a result, the throttle valve 3 is opened. A full open condition of the throttle valve 3 is shown in FIG. 4 (see FIG. 7B).

When a depression force applied to the accelerator pedal is removed from the above condition, the throttle lever 25 is returned to an original position by the biasing force of the back spring 26. Accordingly, the throttle arm 22 and the throttle shaft 4 are also returned to an original position by the biasing force of the relief springs 28A and 28B. As a result, the throttle valve 3 is closed again. Thus, the throttle valve 3 is opened and closed by the operation of the accelerator pedal.

(2) Throttle Valve Operation with Traction Control

Under the depressed condition of the accelerator pedal, when the control circuit 21 determines a slip condition of the driving wheels according to the detection signals from the throttle sensor 17, the driving wheel speed sensor and the driven wheel speed sensor, the control motor 11 is driven in a forward direction by the control circuit 21. Accordingly, the worm wheel 8 is rotated clockwise from the initial condition shown in FIGS. 2 and 4, and the pawl 10 of the worm wheel 8 is brought into engagement with the pawl 16 of the stopper lever 13. Then, the pawl 16 of the stopper lever 13 is urged by the pawl 10 of the worm wheel 18. Accordingly, the stopper lever 13 and the throttle shaft 4 are rotated together in the clockwise direction as viewed in FIG. 5 to thereby close the throttle valve 3 to a predetermined angle. The rotation of the throttle shaft 4 in the closing direction of the throttle valve 3 is followed by the rotation of the throttle arm 22. At this time, the throttle lever 25 is maintained at a position corresponding to a depressed amount of the accelerator pedal. Accordingly, the throttle arm 22 is rotated relative to the throttle lever 25 against the biasing force of the relief springs 28A and 28B. That is, the throttle valve 3 can be closed by the traction control actuator under the depressed condition of the accelerator pedal. Furthermore, a reaction force of the valve closing torque of the actuator to the throttle lever 25 is absorbed by elastic deformation of the relief springs 28A and 28B. Therefore, the reaction force is prevented from being applied through the throttle lever 25 and the accelerator cable 29 to the accelerator pedal (see FIG. 7C).

When the slip condition of the driving wheels is determined to disappear, the control motor 11 is driven reversely by the control circuit 21. Accordingly, the worm wheel 8 is returned to an initial position by the worm gear 12. Thereafter, the throttle valve 3 is operated by the operation of the accelerator pedal.

According to the above preferred embodiment, even when either of the relief spring 28A or 28B is broke, the interconnecting relation between the throttle shaft 4 and the throttle lever 25 can be maintained by the remaining relief spring. Accordingly, the risk of rapid inoperability of the throttle valve 3 can be avoided, and the vehicle can be driven to run for escape to a safe place or a repair shop.

Figure 8:
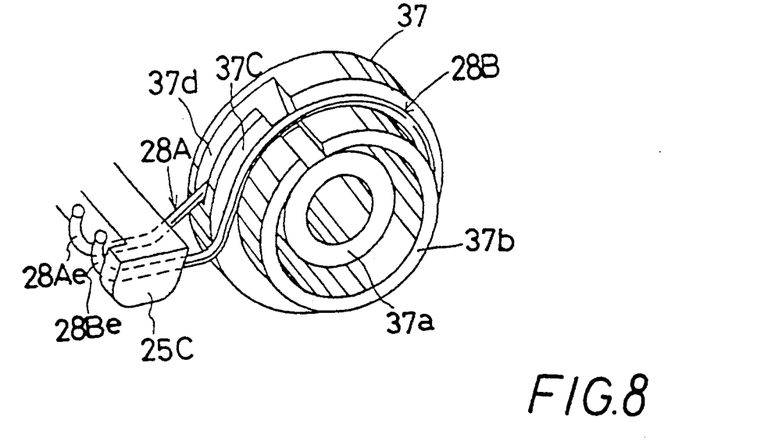
FIG. 8 is an enlarged perspective view of the left spring guide shown in FIG. 1.

Referring to FIG. 8 which is an enlarged perspective view of the left spring guide 37 and a part of the relief springs 28A and 28B, the spring guide 37 includes an inner cylindrical portion 37a to be loosely mounted on the throttle shaft 4 for guiding the inner relief spring 28A, an outer cylindrical portion 37b for guiding the outer relief spring 28B and separating the inner relief spring 28A from the outer relief spring 28B, an opening 37d for guiding the end portion 28Ae of the inner relief spring 28A to the outside, and a flange portion 37c for separating the end portion 28Ae of the inner relief spring 28A from the end portion 28Be of the outer relief spring 28B. By the provision of the flange portion 37c, the interference between the end portions 28Ae and 28Be of the relief springs 28A and 28B can be prevented to thereby ensure the durability of the relief springs 28A and 28B. Although the above description is directed to the left spring guide 37, the same construction is provided for the right spring guide 37.

Figure 9:
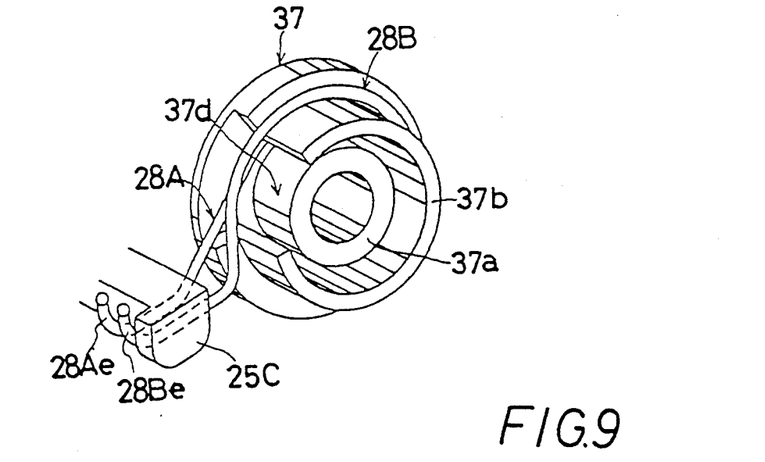
FIG. 9 is a view similar to FIG. 8, showing a test example of the spring guide for a comparative purpose.
Figure 10:
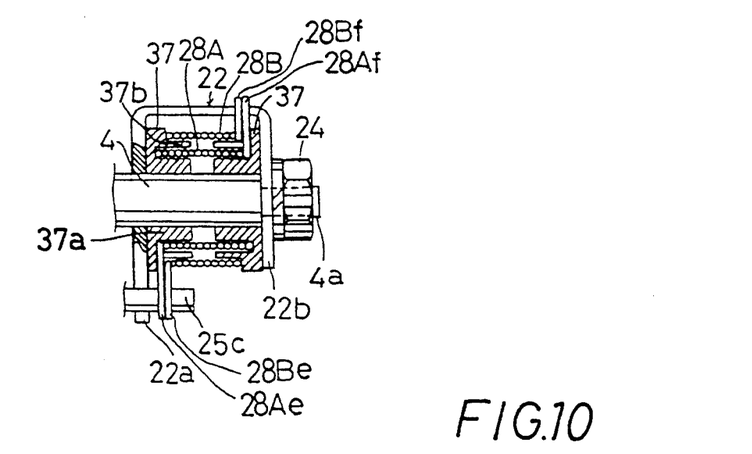
FIG. 10 is a vertical sectional view of an essential part of the control device in case of employing the test example shown in FIG. 9.

For the purpose of comparison, there is shown in FIGS. 9 and 10 a test example of the spring guide excluding the above flange portion 37c. In FIGS. 9 and 10, the same parts as those shown in FIGS. 8 and 1 are designated by the same reference numerals. According to the construction shown in FIGS. 9 and 10, the end portions 28Ae and 28Be of the relief springs 28A and 28B interfere with each other because they are not separated from each other by the flange portion 37c. Accordingly, the durability of the relief springs 28A and 28B cannot be ensured. Particularly in case of operating the engine at a high speed of about 10,000 rpm for a long time, the relief springs 28A and 28B are relatively vibrated at a high frequency to become fatigable.

To the contrary, the construction of the above preferred embodiment including the flange portion 37c eliminates the above problem to ensure the durability of the relief springs 28A and 28B.

Having thus described the preferred embodiments of the invention, it should be understood that numerous structural modifications and adaptations may be made without departing from the spirit of the invention.

What is claimed is:

1. A throttle valve operating device with traction control function comprising:

a throttle shaft; a throttle valve fixed on said throttle shaft, said throttle valve biased to a closed position;

a throttle lever independently rotatable relative to said throttle shaft by a depression force applied to an accelerator pedal;

means for interconnecting said throttle shaft and said throttle lever so as to transmit said depression force applied to said accelerator pedal to rotate said throttle valve into an open position; and a traction control actuator for rotating said throttle shaft and said throttle valve to the closed position irrespective of the depression force of said accelerator pedal, upon detection of a slip condition of a driving wheel;

said interconnecting means includes a substantially U-shaped throttle arm fixed to said throttle shaft and a pair of independently operating springs provided between said throttle lever and said U-shaped throttle arm.

2. The throttle valve operating device as defined in claim 1, wherein said pair of springs comprises torsion coil springs around said throttle shaft.

3. The throttle valve operating device as defined in claim 2 further comprising a pair of spring guides for guiding opposite end portions of said springs, each of said spring guides being provided with a flange portion for separating one end portion of said springs from each other.

4. The throttle valve operating device as defined in claim 3 wherein said spring guides are held in position by said U-shaped throttle arm.

* * * * *